United States Patent [19]

Broshi

[11] Patent Number: 5,556,246
[45] Date of Patent: Sep. 17, 1996

[54] AUTOMATED STORAGE SYSTEM

[75] Inventor: Yuval Broshi, Ramat Gan, Israel

[73] Assignee: ASSA Industries (C.S.) Ltd., Ramat Gan, Israel

[21] Appl. No.: 380,849

[22] Filed: Jan. 27, 1995

Related U.S. Application Data

[63] Continuation-in-part of Ser. No. 40,190, Mar. 29, 1993, abandoned.

[30] Foreign Application Priority Data

Mar. 31, 1992 [IL] Israel ........................................ 101435

[51] Int. Cl.⁶ .............................. B65G 1/04; E04H 6/34
[52] U.S. Cl. ........................ 414/278; 414/273; 414/286; 414/239
[58] Field of Search ....................................... 414/273, 279, 414/286, 233, 234, 236, 237, 239, 240, 278; 364/478

[56] References Cited

U.S. PATENT DOCUMENTS

| | | | |
|---|---|---|---|
| 2,802,582 | 8/1957 | Isven | 414/234 X |
| 3,681,607 | 8/1972 | Hartman, III | 414/286 X |
| 3,973,685 | 8/1976 | Loomer | 414/273 |
| 4,217,070 | 8/1980 | Groger | 414/239 |
| 4,846,627 | 7/1989 | Steuart | 414/233 X |
| 5,067,774 | 11/1991 | Trowland | 298/1 A |
| 5,190,427 | 3/1993 | Lai | 414/236 X |

FOREIGN PATENT DOCUMENTS 2233319  1/1991  United Kingdom.

Primary Examiner—Karen B. Merritt
Assistant Examiner—Stephen Gordon
Attorney, Agent, or Firm—Herbert Dubno

[57] ABSTRACT

An automated system for storing, retrieval and transporting of goods of any shape and size in aisleless warehouses, ships, airplanes, trains and the like. The system also provides aisleless warehouses, parking lots and the like and enables a computerized fully automated handling of stored items such as loading and evacuating of containers. The system provides the moving of the goods by placing same on pallets which travel on a flat and smooth floor. The pallet is provided with elastic air cushions which enable its hovering over the flat surface and a drive to enable the movement to any required direction.

6 Claims, 8 Drawing Sheets 5,556,246

AUTOMATED STORAGE SYSTEM

CROSS REFERENCE TO RELATED APPLICATION

This application is a continuation in part of Ser. No. 08/040,190 filed 29 Mar. 1993 (now abandoned).

FIELD OF THE INVENTION

The present invention relates to a system for the automated storing, retrieval and transporting of goods of any shape and size and configuration in aisleless warehouses, ships, airplanes, trains, trucks or other apparatus for storing and transporting of goods. The system also provides for erecting of aisleless warehouses, aisleless parking buildings, aisleless parking lots and aisleless storage areas for maximum use of available space.

The invention relates particularly, but not exclusively, to automated storage, retrieval and transportation of goods stacked on pallets and to all kings of containers.

The invention further relates to the automatic storage and retrieval of cars in parking buildings or parking lots. The invention enables a computerized fully automated handling of stored items, within an aisleless warehouse, from the warehouse to the transporting vehicle, from one transporting vehicle to another and from a vehicle to a warehouse. It will also enable automated loading and evacuating of containers and automated loading and unloading of the containers to the transporting vehicle or a storage area. The new means can be mounted on a fixed basis or on mobile units such as ships, airplanes, trains, trucks and containers. It can be mounted as single level or as multilevel structures in any conceivable arrangement of rectangular units.

SUMMARY OF INVENTION

According to the invention there is provided a system for the storing, retrieving and transporting of goods which are placed on a thin smooth bottomed plate or pallet, the underneath side of which is provided with a plurality of air cushions and a plurality of short leg-like members, a stream of computer controlled compressed air is directed into said air cushions and a supporting floor which is provided with outlets for the compressed air which enables frictionless movement of said pallet, means being provided to effect lateral or longitudinal motion of said pallet, to be placed in a storage area divided into rectangular units each of which contains an air pressure on/off control valve and a lateral and longitudinal motion means, each of said units is individually connected to a main controlling computer, which controls the system as a whole. In practice the motion means can be any mechanical pneumatic, electric or hydraulic means.

Vehicles, cargo or any other goods can be divided into units and placed on pallets as described above. Each of the above units can be individually connected to an onboard controlling computer.

A standard computer interface is provided to link the computer and warehouse computer.

All pallets fit the measurements of said rectangular units to enable free motion from one unit to the other in either the longitudinal or lateral directions. The stored goods are placed on the carrying plate in a designated area outside the storage area. The loaded pallet is then lifted on an air cushion and set into motion by the means provided, controlled by the controlling computer. Each of the individual units which the pallet is about to pass will be activated before the pallet enters, to ensure smooth motion of the pallet. Each of the units already passed by the pallet will be immediately de-activated. The controlling computer will place the above pallet at random or according to software defined criteria within the storage area. To enable movement of a pallet in a storage area which contains many other pallets, the computer will dynamically evacuate all necessary plates sideward as to form a dynamic aisle through which the desired pallet will move from one point to the other. For loading to or unloading from a vehicle or container, it is placed adjacent to the storage area with its floor level at the same level as the storage area floor level as to form a single surface. The vehicles onboard computer is connected to the storage area computer to enable the movement of pallets to and from the vehicle or container.

In order to erect a multilevel storing warehouse an elevator must be added. The elevator will contain one or more such rectangular units, which is identical in size to the warehouse units. Each of the said rectangular units will contain air pressure on/off control valve and lateral and longitudinal motion inducers.

Each of the above units and the elevator control are connected to the main controlling computer. The elevator is mounted adjacent to the warehouse, so at each level it stops, a smooth continuous surface will be formed to allow the pallet's frictionless movement to and from the elevator. The controlling computer with suitable software will handle all movements of the pallets and record at every instant the whereabouts of each item in the storage area. It manipulates the pallets to enable storage and retrieval of goods and calculates the path of movement for each pallet simultaneously to ensure smooth movement to and from the storage area exit.

BRIEF DESCRIPTION OF THE DRAWING

The invention will now be described with reference to the drawing in which.

DETAILED DESCRIPTION OF THE INVENTION

Figure 1:
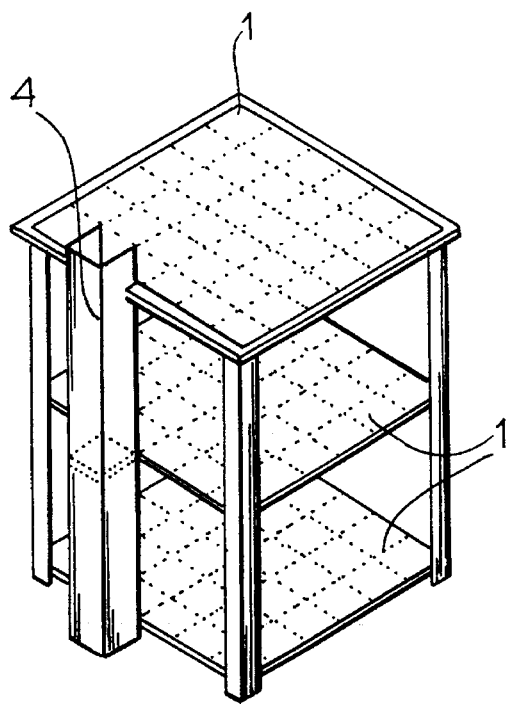
FIG. 1 is a perspective schematic illustration of a multi-level storage facility.
Figure 2:
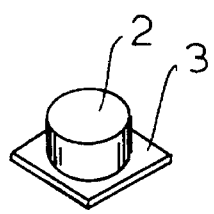
FIG. 2 is a perspective view of a storing pallet and an article placed thereon.
Figure 4A:
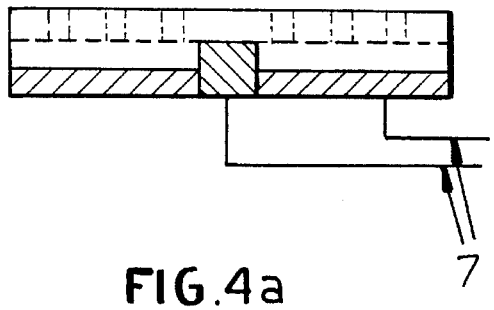
FIGS. 4a and 4b are a section and a top view of an embodiment of a storing unit.
Figure 5A:
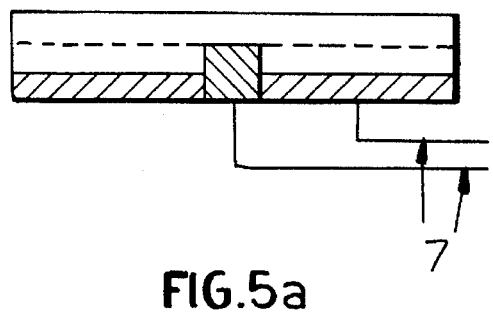
FIGS. 5a and 5b are a section and a top view of a further embodiment of a storing unit.
Figure 4B:
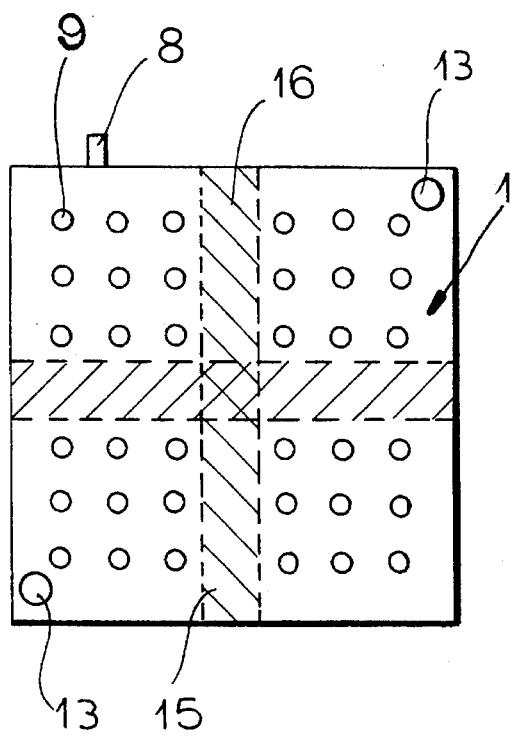
Figure 5B:
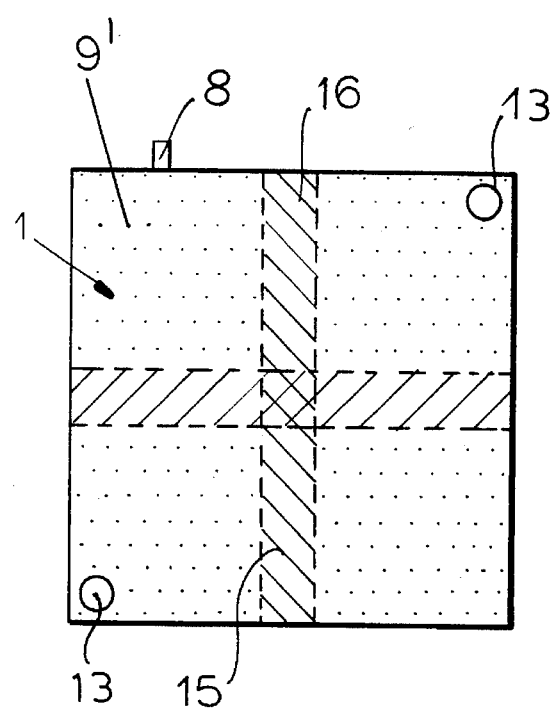

FIG. 1 illustrates schematically a storing facility having three storing planes or levels, each of which is divided into a large number of rectangular units 1. The goods 2 to be stored are placed on a carrying plate or pallet 3 (FIG. 2) which in turn is placed, if so required, in an elevator 4 which elevates same to the desired storage plane level.

When elevator 4 stops, it forms a continuous surface with the storage plane, which comprises as stated above, a large number of rectangular units 1.

Figure 3:
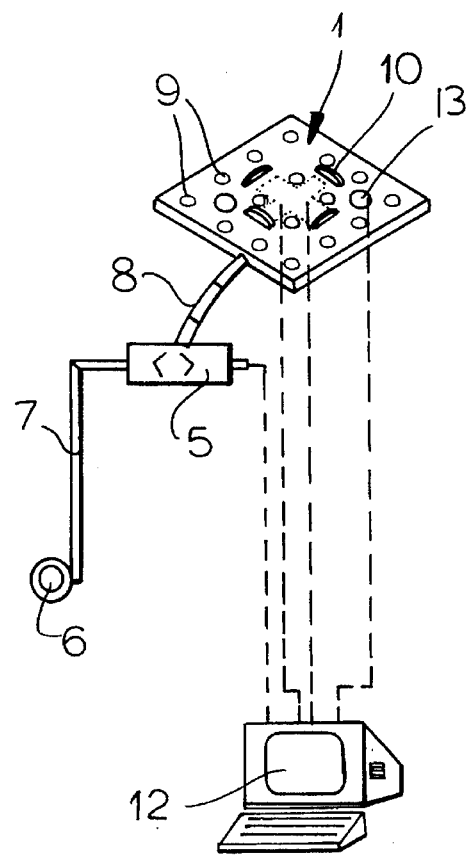
FIG. 3 is an enlarged perspective illustration of a storing unit and related equipment.

A pressurized air valve 5 (FIG. 3) is turned on to form a thin air cushion between the carrying pallet 3 and the surface thereunder, namely units 1. Simultaneously pressurized air is directed underneath the adjacent rectangular unit, to form a frictionless movement surface between two adjacent units. The pressurized air is obtained from pump 6, and delivered by means of conduits 7 and 8 underneath unit 1 and released via a plurality of apertures 9. Pallet 3 is moved by means of different means 10 as will be described. Unit 1 is further provided with sensors 13. When sensors of both the elevator's rectangular unit and the storage area's rectangular unit 1 sense that the carrying pallet 3 entirely moved from the elevator to the adjacent storage area unit 1 the elevator unit air pressure valve is turned off and simultaneously the air pressure valve of the next adjacent rectangular unit in,the desired direction of movement is turned on, enabling the continuous movement of the carrying pallet 3. The movement can be induced by lateral motion inducing means 10 or by a longitudinal motion inducing means to enable movement of the carrying pallet in any of the four possible directions. When the carrying pallet with its load finally reaches its designated storage place the local air pressure valve is turned off to stop the air film effect under the carrying plate or pallet so it can rest on the storage plane.

All the above functions are controlled by a computer 12 which is connected to all of the units in the system. The computer manipulates the movement of all the carrying pallets in the storage area to clear the path for ingoing or outgoing carrying pallets with the goods placed thereon.

In the same manner any goods can be delivered and transported from one unit of the warehouse to another warehouse by using trucks equipped with the same facilities. Likewise goods can be transferred to ships, air cargo aircraft and the like. FIGS. 4a, 4b, 5a and 5b illustrate a storing unit 1 provided with two linear motors 15 and 16 to induce lateral and longitudinal movement. The storing units 1 are provided with holes 9 or are made of porous material 9' through which the air stream passes to create the required air cushion. Both motors are activated by electric power controlled by means of computer 12.

Figure 6A:
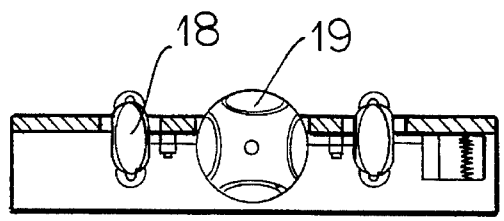
FIG. 6a is a section along line Via—Via of FIG. 6b
Figure 7:
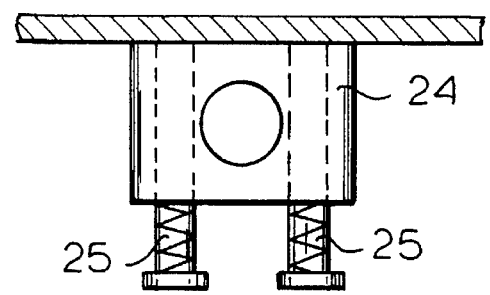
FIG. 7 is an enlarged detail of the embodiment of FIGS. 6a and 6b.
Figure 6B:
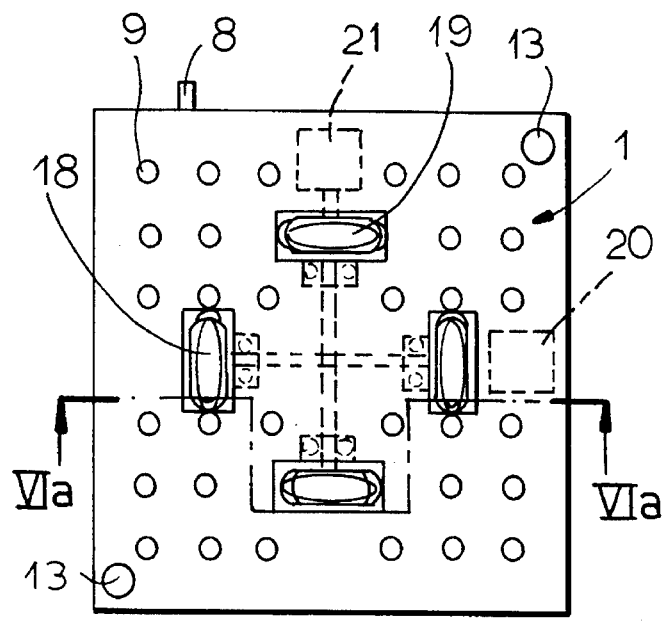
FIG. 6b is a top view of yet a further embodiment of said unit.
Figure 8A:
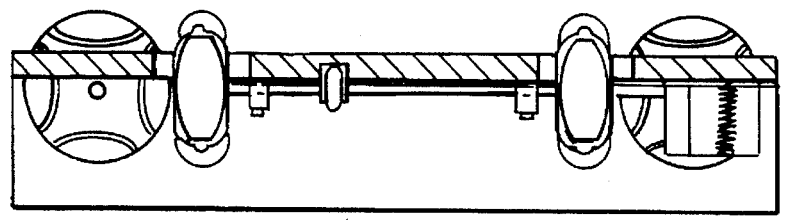
FIG. 8a is a section along line VIIIa—VIIIa of FIG. 8b
Figure 8B:
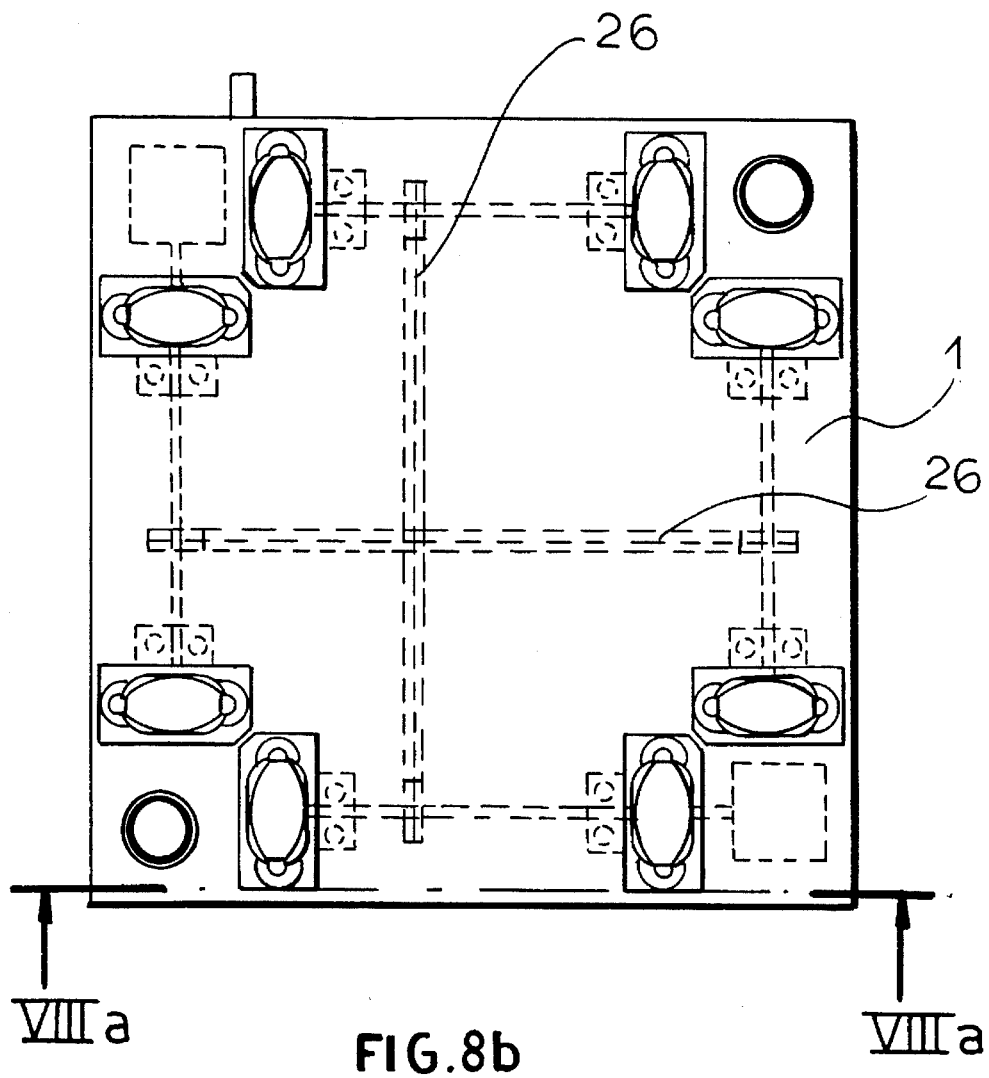
FIG. 8b is a top view of a further embodiment of said unit.

FIGS. 6a, 6b and 7 illustrate a different embodiment of storing unit 1. This unit is provided with two pairs of omnidirectional wheels 18 and 19. The two pairs being connected to two motors 20 and 21. By activating either motor 20 or motor 21 the required lateral or longitudinal movement of the storing pallet is obtained. FIG. 7 illustrates the manner in which said mechanism is mounted. The wheels 18 or 19 are mounted within a housing 24. Two springs 25 urge the wheels to establish contact with the pallet travelling thereon even though said pallet is slightly elevated by means of the air cushion. FIGS. 8a and 8b illustrate a different arrangement of unit 1. In this arrangement 4 pairs of wheels are mounted within unit 1 each opposing pair is interconnected by means of a chain or other drive 26 to enable simultaneous function.

Figure 9:
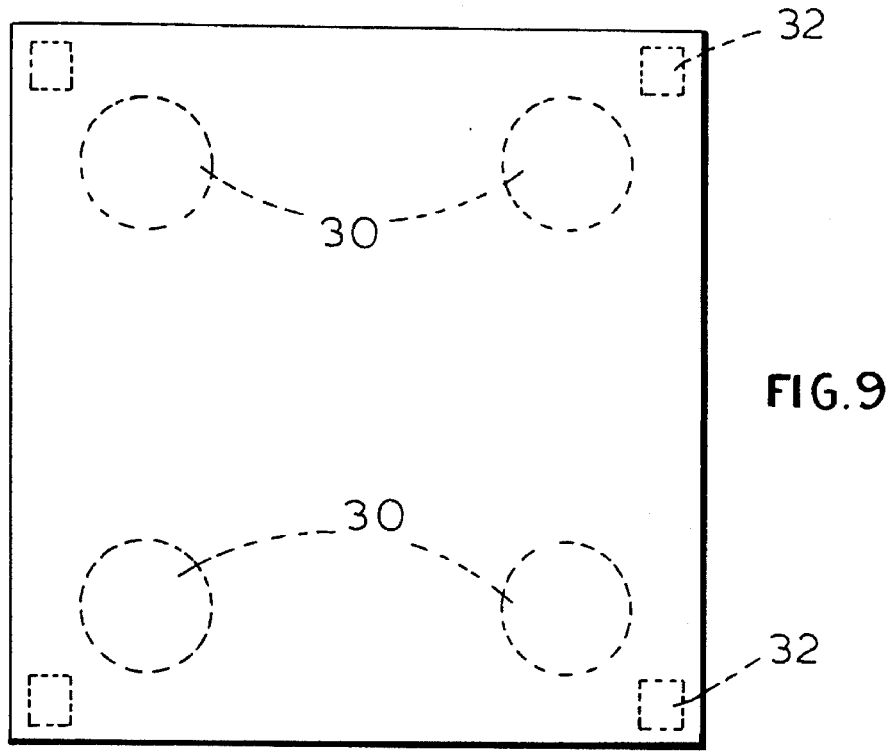
FIG. 9 is a top view of a carrying pallet.

FIG. 9 is a top view of carrying pallet 3 which is provided with four air cushions or cells 30 and four short leg-like members 32 which enable pallet 3 to rest on the units 1 when not in motion.

Figure 10:
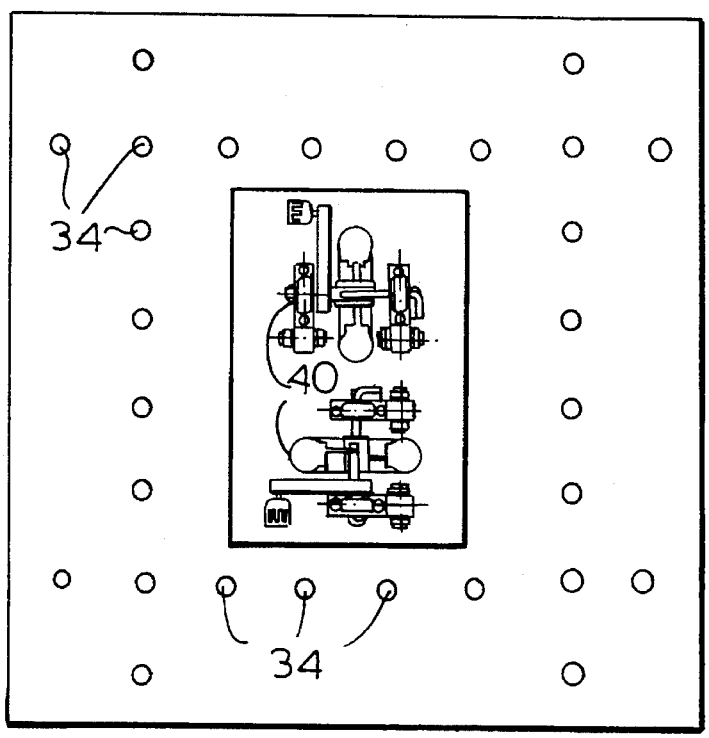
FIG. 10 is a top view of a floor unit.

FIG. 10 is top view of a section of the floor (unit 1) on which pallet 3 travels and which comprises a plurality of apertures or air outlets 34 being precisely in a planned route of air cushions 30 in the lateral or longitudinal direction. The distance between openings 34 is smaller than the diameter of air cushion 30 such that it will enable the air cushions 30 would cover two apertures 34 simultaneously (thus it will receive pressurized air from one outlet until it meets the adjacent one). There are further being provided propelling means 40 adapted to move pallet 3 in either longitudinal or lateral directions.

Figure 11:
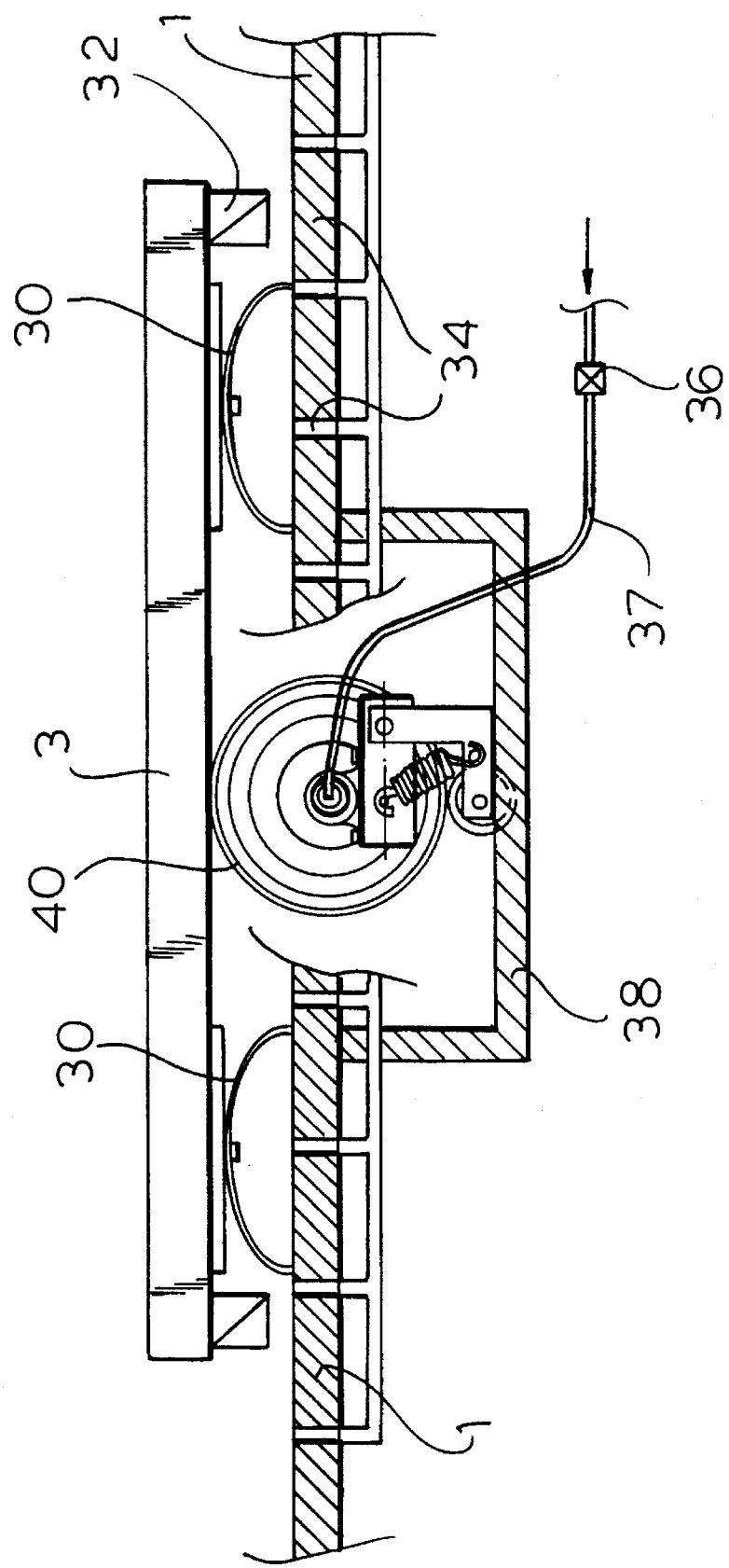
FIG. 11 is a cross section of the floor unit of FIG. 10 and showing the propelling means.

FIG. 11 is a sectional side illustration of the floor and the propelling means 40 provided.

Carrying pallet 3 comprises elastic air cushions or cells 30 and short leg members 32. The carrying pallet hovers over floor units 1 which are part of a warehouse floor. In the floor there are provided air outlets 34 which receive pressurized air from valve 5 (FIG. 3) controlled by computer 12.

There are further provided two propelling means 40, one for the lateral direction and the second the longitudinal direction being rigidly connected to frame 38. The wheels are connected to a source of pressurized air via three way valve 36 by conduit 37.

Figure 12:
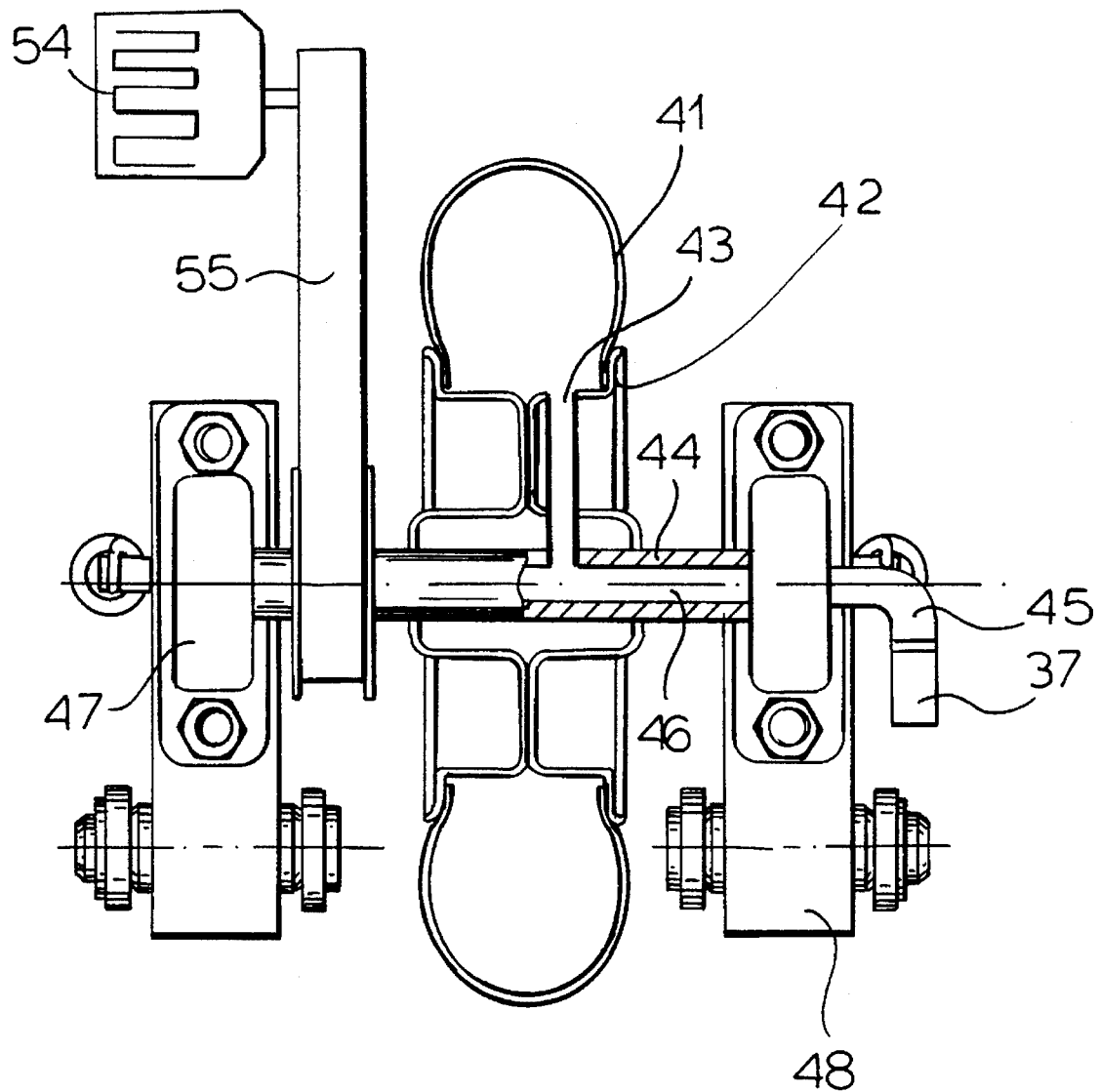
FIG. 12 is a sectional illustration of the propelling means.
Figure 13:
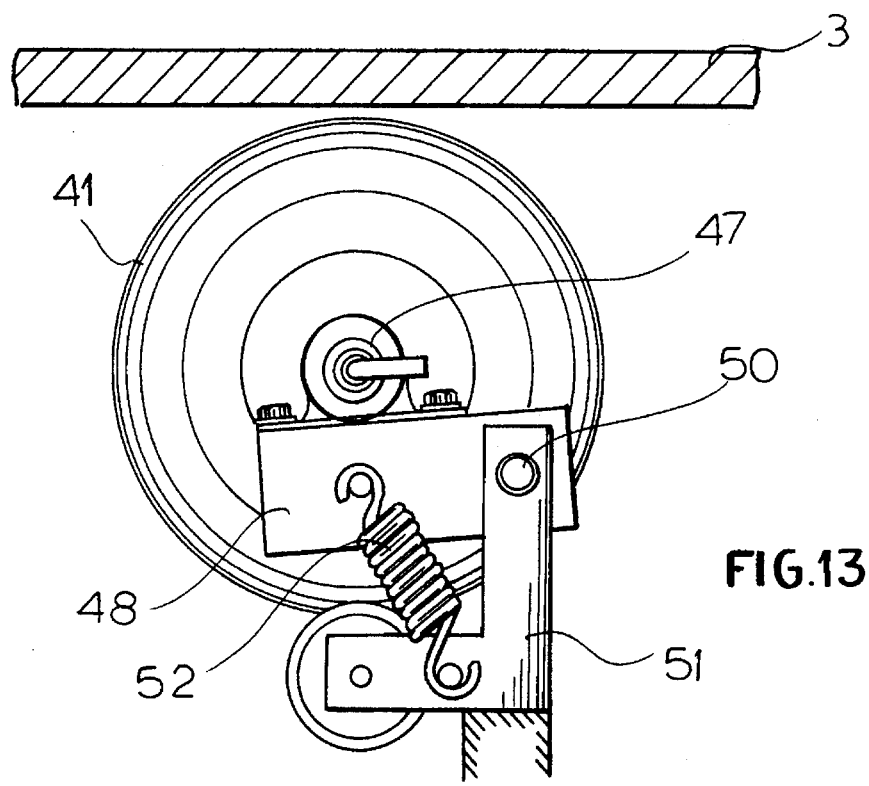
FIGS. 13 and 14 are elevational views showing two positions of the propelling means.
Figure 14:
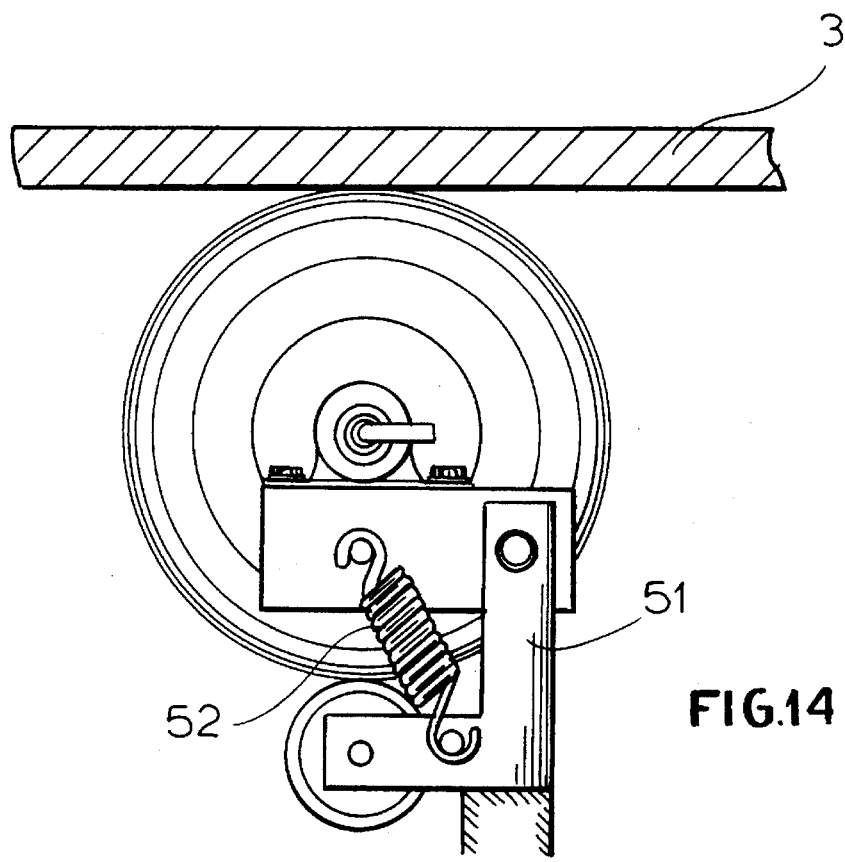

FIG. 12 is a top sectional illustration of the propelling means 40. The propelling means 40 comprises a tire 41 placed over wheel 42 which is connected to axle 44. Air passage 43 connects tire 41 and bore 46 provided in axle 44. To the bore 46 there is connected a pivoting air connector 45 through which pressurized air is supplied to inflate tire 41 at will. The axle is supported by bearings 47 which are connected to swinging arms 48. As can be seen in FIGS. 13 and 14 these arms 48 are fulcrumed by pin 50 which enables them to swing up and down. Pin 50 is supported by the base structure 51 which is rigidly connected to the base of the floor frame 38. A spring 52 is mounted intermediate swinging arm 48 and support 51. When tire 41 is inflated via conduit 37 contact will be established between the tire 41 and pallet 3 (FIG. 14). When air valve 36 is open, air from tire 41 will escape thus the tire will be pulled downwardly by spring 52 and disconnected from pallet 3. The said spring would also resist the force created by motor 54 and belt 55 on axle 44.

As seen in FIG. 14 the propelling system is in contact with pallet 3 when tire 41 is inflated. When motor 54 is activated its rotation is transferred by belt 55 to wheel 42, and by tire 41 to pallet 3.

The engagement of tire 41 and pallet 3 is disconnected when the air is released through valve 37 and the spring pulls the wheel downwardly.

Pressurized air being supplied via conduit 37 and released via aperture 34 in floor part 1 into the air cushions 30 which causes the air cushion to be inflated, The blown up air cushions elevate carrying pallet 3 and lift legs 32 off the floor. Pressurized air is fed to tire 41 of the propelling means 40, the tire will be inflated and establish connection with the carrying pallet 3. The motor is turned on to rotate the wheel and the pallet is moved in the required direction, At the end of the motion the motor is switched off and the air is released from the tire which will enable the spring to pull the tire downwardly. The air supply is cut off and the plate comes to rest with its legs on the floor part at that point.

I claim:

1. A system for storing, retrieving and transporting goods, comprising:

a pallet carrying goods to be stored, retrieved and transported and including:

a plate having a top surface receiving said goods and a bottom, a plurality of short legs projecting downwardly from said bottom and supporting said pallet at rest, and a plurality of downwardly open flexible cells formed on said bottom and adapted to laterally confine respective air cushions supporting said plate during travel thereof;

at least one storage area formed with a floor subdivided into rectangular units at each of which said pallet can be positioned, each of said rectangular units comprising:

air-outlet means communicating with a source of pressurized air for supplying pressurized air to said cells to form said air cushions, control means for selectively controlling the supply of air to selective air-outlet means of said units to support said pallet as said pallet travels over selected units to position said pallet on said floor, said pallet resting by said legs on said floor upon termination of the supply of pressurized air at a selected one of said units, and lateral motion means and longitudinal motion means operatively connected to said pallet as said pallet is displaced over a respective unit to displace the pallet selectively in lateral and longitudinal directions, respectively; and computer means connected to all of said motion means and control means of all of said units for operating said control means and said motion means selectively to displace said pallet aislefree from one of said units to another of said units over said storage area.

2. The system defined in claim 1 wherein said control means is an on/off control valve and said source is an air pump, the control valves of all of said units and said air pump being controlled by said computer means.

3. The system defined in claim 1 wherein said lateral motion means and longitudinal motion means are respective linear motors.

4. The system defined in claim 1 wherein said lateral motion means and longitudinal motion means are respective pairs of wheels connected to respective motors controlled by said computer means.

5. The system defined in claim 4, further comprising a spring mechanism floatingly mounting said wheels.

6. The system defined in claim 1 wherein at least one of said lateral motion means and longitudinal motions means includes a wheel provided with an inflatable tire, further comprising means connected with said computer means for inflating said tire to press said tire against said pallet.

* * * * *